United States Patent
Watanabe et al.

(10) Patent No.: US 9,342,905 B2
(45) Date of Patent: May 17, 2016

(54) METHOD AND APPARATUS FOR DISPLAYING TUBULAR OBJECT

(71) Applicants: FUJITSU LIMITED, Kawasaki-shi, Kanagawa (JP); The University of Tokyo, Tokyo (JP)

(72) Inventors: Masahiro Watanabe, Kawasaki (JP); Satoshi Fuchikami, Fukuoka (JP); Yoshimasa Kadooka, Kawasaki (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); The University of Tokyo, Tokyo (JP)

( * ) Notice: Subject to any disclaimer, the term of this patent is extended or adjusted under 35 U.S.C. 154(b) by 350 days.

(21) Appl. No.: 13/939,619

(22) Filed: Jul. 11, 2013

(65) Prior Publication Data
US 2014/0022259 A1    Jan. 23, 2014

(30) Foreign Application Priority Data
Jul. 17, 2012 (JP) .................. 2012-158749

(51) Int. Cl.
*G06T 11/20* (2006.01)
*G06T 17/20* (2006.01)
*G06T 17/10* (2006.01)

(52) U.S. Cl.
CPC ............... *G06T 11/203* (2013.01); *G06T 17/10* (2013.01); *G06T 17/20* (2013.01)

(58) Field of Classification Search
CPC ...... G06T 17/20; G06T 17/205; G06T 17/203
See application file for complete search history.

(56) References Cited

U.S. PATENT DOCUMENTS

| 2005/0018900 A1* | 1/2005 | Bruijns ..................... G06T 7/00 382/154 |
| 2008/0094389 A1* | 4/2008 | Rouet .................. G06K 9/0014 345/419 |
| 2008/0273777 A1* | 11/2008 | Luboz ................... G06T 7/0081 382/130 |
| 2010/0021025 A1* | 1/2010 | Hof ........................ G06T 7/0012 382/128 |
| 2011/0093243 A1* | 4/2011 | Tawhai ............... G06F 17/5018 703/2 |

OTHER PUBLICATIONS

"AVS/Express Module reference", Cybernet Systems Co., Ltd, p. T-84, Aug. 1, 2010 (with English Translation) 7 pages.
Denis Spahic et al. "Visualization of Human Motion Using Paraview-Open Source Scientific Visualization", 15th International Research/Expert Conference "Trends in the Development of Machinery and Associated Technology", TMT 2011, Sep. 2011 p. 949-952.

* cited by examiner

*Primary Examiner* — Michelle L Sams
(74) *Attorney, Agent, or Firm* — Oblon, McClelland, Maier & Neustadt, L.L.P.

(57) ABSTRACT

A disclosed display processing method includes: first generating data of a faying surface region between a first line element, for which a greatest radius is defined, and a second line element, for which a second greatest radius is defined, at a point where end points of plural line elements are connected, by using data of plural line elements for which a radius and coordinates of both end points are defined and data representing connection relationships between line elements; and second generating, for each line object of the plural line elements, data of a tubular object that is defined based on a faying surface region generated for the line element.

6 Claims, 9 Drawing Sheets

RELATED ART

METHOD AND APPARATUS FOR DISPLAYING TUBULAR OBJECT

CROSS-REFERENCE TO RELATED APPLICATIONS

This application is based upon and claims the benefit of priority of the prior Japanese Patent Application No. 2012-158749, filed on July 17, 2012, the entire contents of which are incorporated herein by reference.

FIELD

This invention relates to a display processing method and apparatus.

BACKGROUND

The numerical analysis using a high-speed computer is performed in various fields. For example, in a medical field, the numerical analysis to reproduce the phenomena of the heart is conducted for a coronary circulation (a coronary artery and coronary vein) that is an organ for transporting oxygen and the like to the heart. In this numerical analysis, there is a case where a model using the collinear approximation, in other words, a model in which plural segments are connected, instead of using the tubular shape for the vessel as it is.

Figure 1:
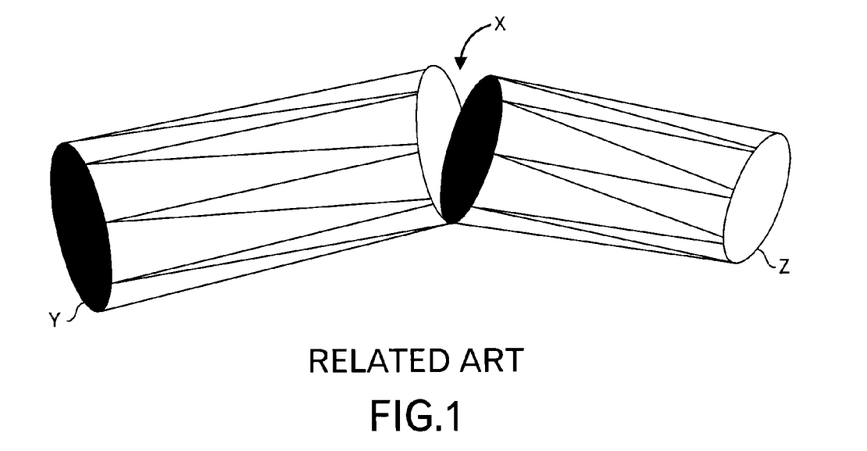
FIG. 1 is a diagram to explain a problem in a conventional art.

A tubular object visualization program to visualize such a model in which the plural segments are connected as a tubular object has already exist, however, a problem as illustrated in FIG. 1 occurs, when this visualization program is used as it is. In an example of FIG. 1, two segments are connected at one point, however, when the two segments are not on one straight line, a first tubular object Y that is generated for a first segment and a second tubular object Z that is generated for a second segment are not appropriately jointed, and a gap X occurs. Such a gap does not exist in the actual vessel, however, the existing visualization program does not have any means to solve such a problem.

SUMMARY

A disclosed display processing method relating to this invention includes: (A) first generating data of a faying surface region between a first line element, for which a greatest radius is defined, and a second line element, for which a second greatest radius is defined, at a point where end points of plural line elements are connected, by using data of plural line elements for which a radius and coordinates of both endpoints are defined and data representing connection relationships between line elements; and (B) second generating, for each line object of the plural line elements, which are stored in the data storage unit, data of a tubular object, by using a faying surface region incase where a faying surface region is generated for an end point of the line element and by using a surface region that has a radius defined for the line element and is perpendicular to the line element in case where no faying surface region is generated for an end point of the line element; and (C) displaying the data of the tubular object.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 2:
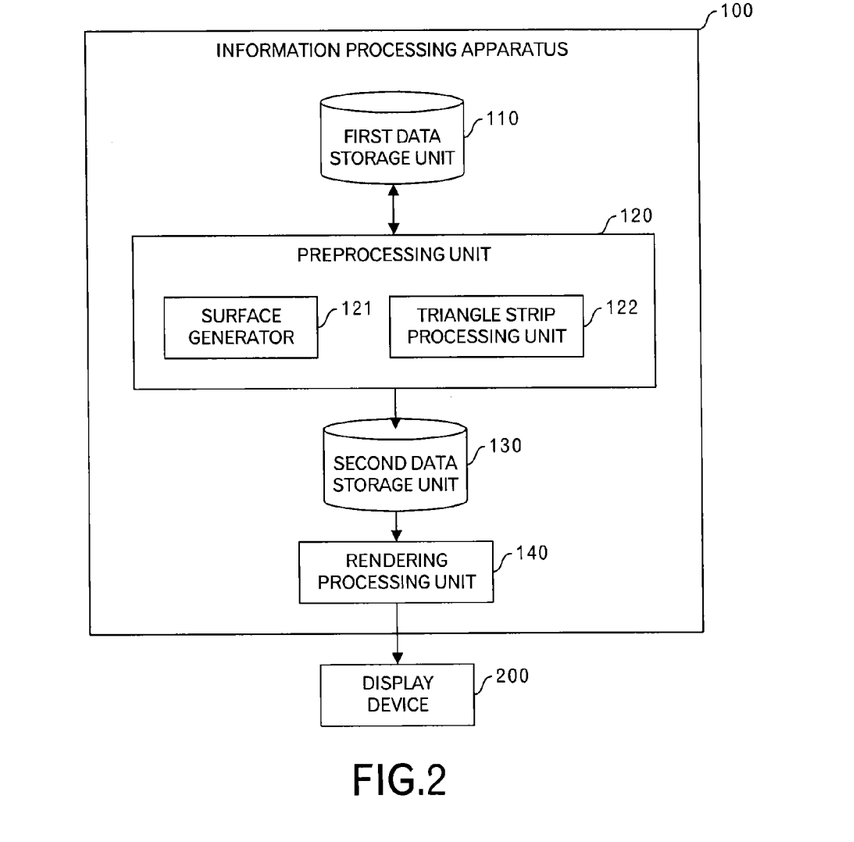
FIG. 2 is a functional block diagram of an information processing apparatus relating to an embodiment of this invention.

FIG. 2 illustrates a functional block diagram of an information processing apparatus 100 relating to one embodiment of this invention. The information processing apparatus 100 is connected to a display device 200, and has a first data storage unit 110, a preprocessing unit 120, a second data storage unit 130 and a rendering processing unit 140.

Figure 3:
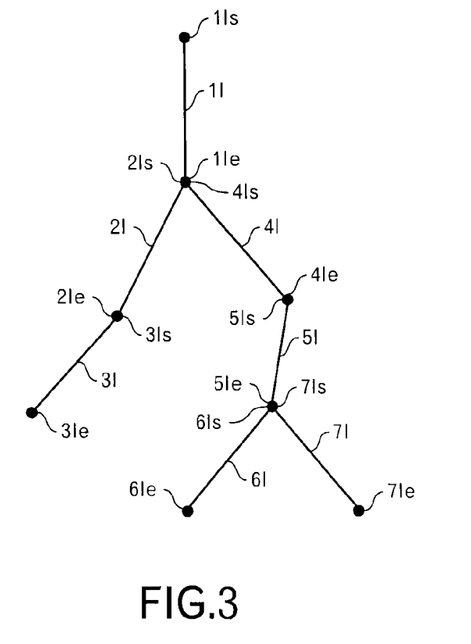
FIG. 3 is a diagram to explain a line element.

The first data storage unit 110 stores data representing a state in which plural line elements are connected as illustrated, for example, in FIG. 3. In the example of FIG. 3, line elements $1l$ to $7l$ are connected. More specifically, line elements $2l$ and $4l$ are connected to a line element $1l$, a line element $3l$ is connected to the line element $2l$, a line element $5l$ is connected to the line element $4l$, and line elements $6l$ and $7l$ are connected to the line element $5l$.

Data of the line element includes a length of the line element, a radius at the center of the line element, and data of any physical value that is a result of the numerical analysis, and is stored in the first data storage unit 110.

Data for both end points s and e of each line element includes data of their coordinates, and is stored in the first data storage unit 110. Moreover, data representing a connection relationship between the line elements is also stored in the first data storage unit 110. For example, as the data representing the connection relationship between the line elements, data to correlate connected end points is stored in the first data storage unit 110. In the example of FIG. 3, end point $1le$ of the line element $1l$, end point $2ls$ of the line element $2l$ and end point $4ls$ of the line element $4l$ are correlated, end point $2le$ of the line element $2l$ and end point $3ls$ of the line element $3l$ are correlated, end point $4le$ of the line element $4l$ and end point $5ls$ of the line element $5l$ are correlated, and end point $5le$ of the line element $5l$, end point $6ls$ of the line element $6l$ and end point $7ls$ of the line element $7l$ are correlated.

When the line elements are line elements representing the coronary circulation, data of the coronary artery and data of the coronary vein are prepared. Moreover, the first data storage unit 110 also stores data during the processing executed by the preprocessing unit 120.

The preprocessing unit 120 has a surface generator 121 and a triangle strip processing unit 122, and performs a preprocessing for the rendering processing, and stores the processing results into the second data storage unit 130. The rendering processing unit 140 performs the rendering processing for polygons, which has already exists, and displays the rendering result onto the display device 200.

Figure 4:
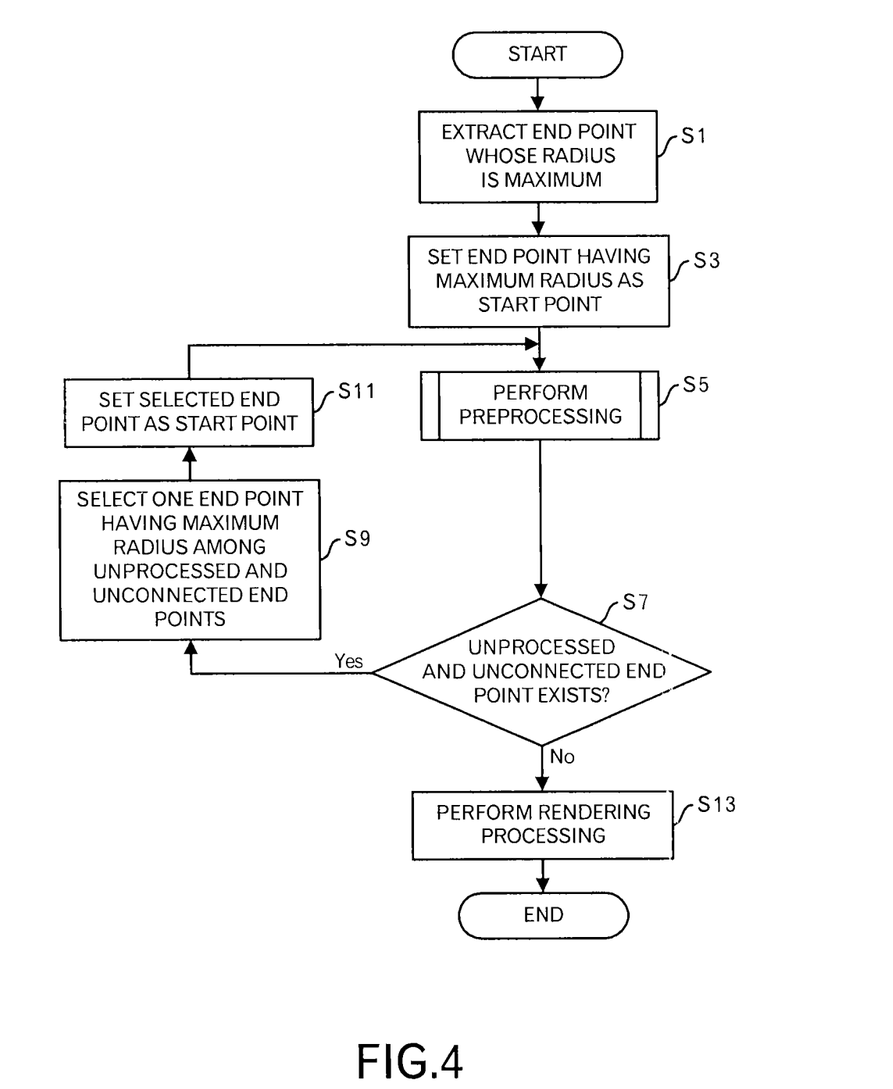
FIG. 4 is a diagram depicting a main processing flow relating to the embodiment.

Next, the processing contents of the information processing apparatus 100 illustrated in FIG. 2 will be explained by using FIGS. 4 to 14. Firstly, the surface generator 121 of the preprocessing unit 120 extracts an end point for which the longest radius (i.e. the maximum radius) is set, from data of the line elements, which is stored in the first data storage unit 110 (FIG. 4: step S1). In case of the coronary circulation, the vessel gradually becomes narrow, so the following processing will appropriately be executed by tracing the vessel from the thickest vessel.

Moreover, the surface generator 121 of the preprocessing unit 120 sets the end point for which the longest radius is set as a start point (step S3). Then, the preprocessing unit 120 performs the preprocessing (step S5). The preprocessing will be explained by using FIGS. 5 to 14.

Figure 5:
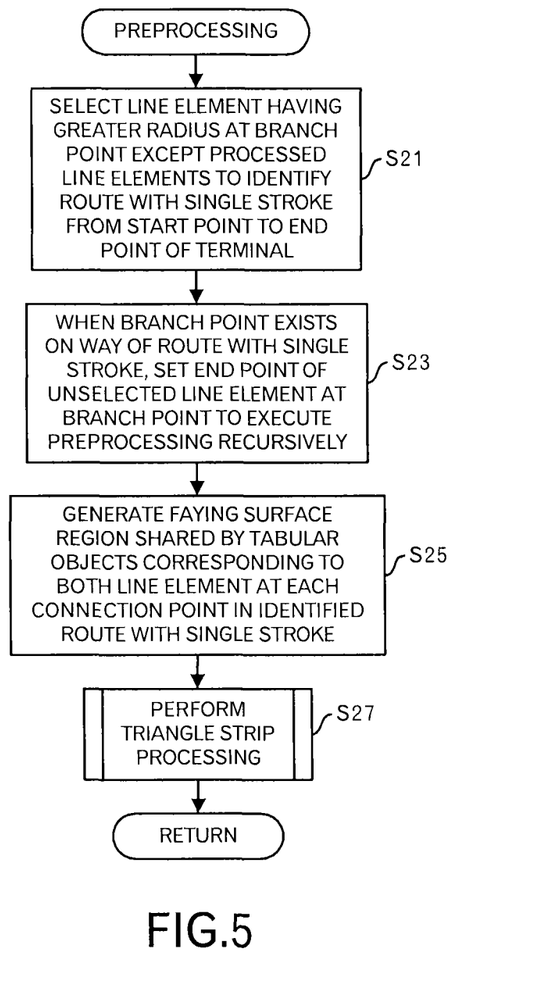
FIG. 5 is a diagram depicting a processing flow of a preprocessing.

The surface generator 121 of the preprocessing unit 120 selects a line element whose radius is the longest at a branch point except for the line elements that have already processed, from data of the line elements, which is stored in the first data storage unit 110, in sequence, to identify a route with a single stroke from the start point to the endpoint of the terminal (FIG. 5: step S21).

Figure 6:
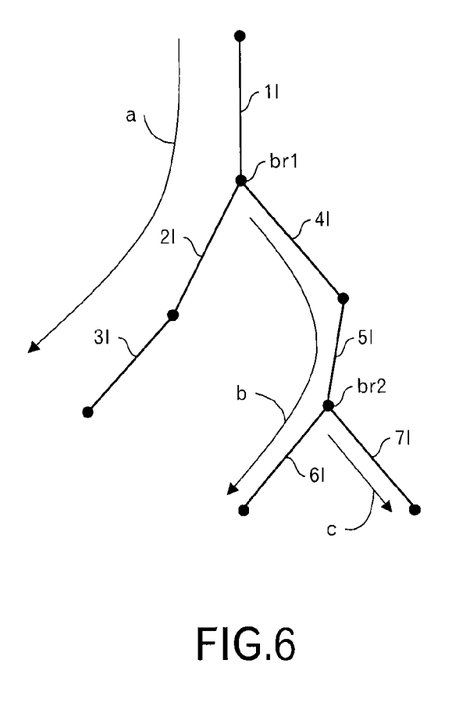
FIG. 6 is a diagram to explain an example of line elements.

When considering the line elements illustrated in FIG. 3 again, in case of "radius of the line element 1*l*>radius of the line element 2*l*>radius of the line element 4*l*", the line element 2*l* is selected at the connection point (i.e. branch point br1) of these line elements. Then, at the step S21, as illustrated in FIG. 6, a route a with a single stroke, which includes the line elements 1*l*, 2*l* and 3*l*, is identified. However, one branch point exists.

Then, when any branch point exists on the way of the route with a single stroke, which was identified at the step S21, the surface generator 121 sets the end point of any one element, which was not selected at the branch point, as the start point, and performs this preprocessing recursively (step S23).

Because the branch point br1 has been detected in the example of FIG. 6, the endpoint 4*ls* of the unselected line element 4*l* is set as the start point at the branch point br1, and this preprocessing is conducted. Then, in the example of FIG. 6, after tracing the line elements 4*l* and 5*l*, the line element 6*l* is selected at the branch point br2, because of "radius of the line element 6*l* >radius of the line element 7*l*", then a route b with a single stroke is identified. Because the branch point br2 exists on the way of the route b with a single stroke, the endpoint 7*ls* of the unselected line element 7*l* at the branch point br2 is set as the start point, then, this preprocessing is further carried out. Then, a route c with a single stroke, which only includes the line element 7*l*, is identified. Because there is no branch point in the route c with a single stroke, which only includes the line element 7*l*, the step S23 is not executed. When plural branch points are detected on the way of the route with a single stroke, this preprocessing is recursively executed for each branch point. Furthermore, when plural unselected line elements exist at one branch point, this preprocessing is recursively executed for each unselected line element.

Moreover, the surface generator 121 generates, for each connection point of the identified route with a single stroke, data of a faying surface region (also called shared surface region), which is shared by tubular objects corresponding to both line elements relating to the connection point, and stores the generated data into the first data storage unit 110 (step S25).

Figure 7:
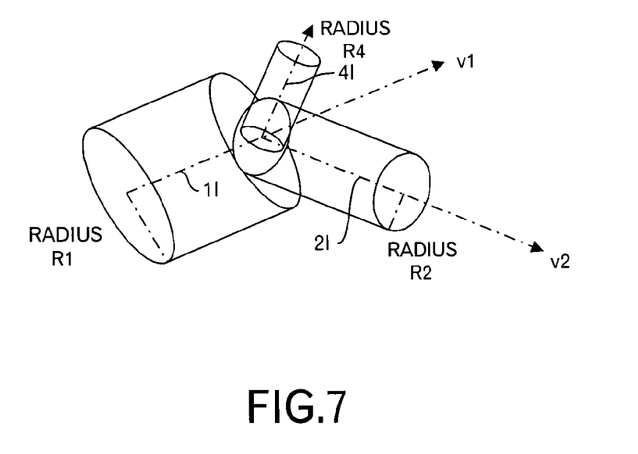
FIG. 7 is a diagram to explain a faying surface region.
Figure 8:
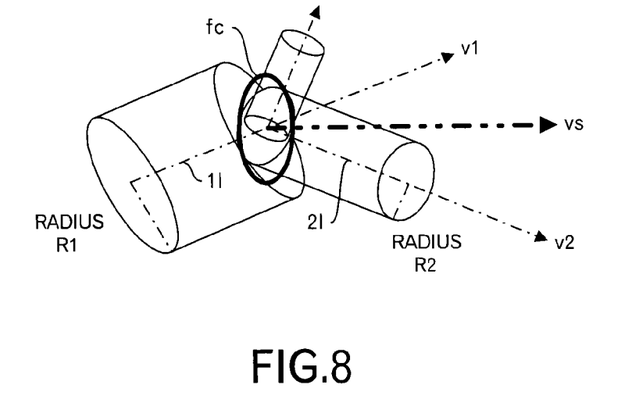
FIG. 8 is a diagram to explain the faying surface region.

A processing for the branch point br1 (=connection point) in the example of FIG. 6 will be explained by using FIGS. 7 to 9. As illustrated in FIG. 7, it is presumed that the radius of the line element 1*l* is R1, the radius of the line element 2*l* is R2, the radius of the line element 4*l* is R4, and R1>R2>R4 is satisfied. Then, in this embodiment, as illustrated in FIG. 8, a faying surf ace is generated, which has a direction $v_s$ as the normal line direction, which is obtained by adding a unit vector v1 having a direction of the line element 1*l* with the greatest radius and a unit vector v2 having a direction of the line element 2*l* with the second greatest radius. Furthermore, the connection point is used as the center, and the average value of two radii is determined as a range of the faying surface. In other words, the faying surface region $f_c$ is identified, which is obtained by cutting a circle having the average of the two radii as the radius and the connection point as the center.

Figure 9:
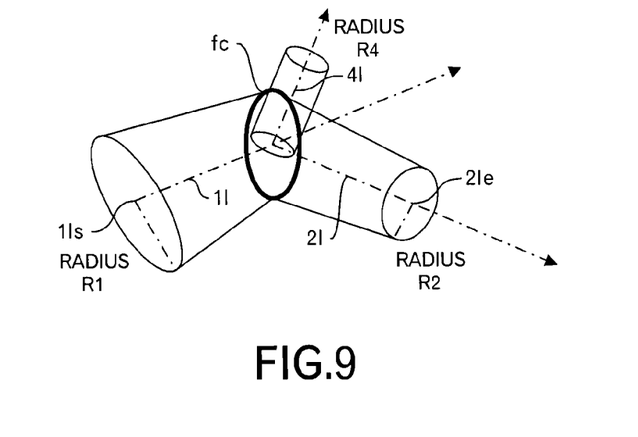
FIG. 9 is a diagram to explain a tubular object.

In this example, as illustrated in FIG. 9 as a result, a first tubular object, second tubular object and a side surface of a cylinder are connected, wherein the first tubular object has a surface connecting a perimeter of a circle having a radius R1 and whose center is the end point 1*ls* of the line element 1*l* with a perimeter of the faying surface region $f_c$, the second tubular object has a surface connecting a perimeter of the faying surface region $f_c$ with a perimeter of a circle having a radius R2 and whose center is the end point 21*e* of the line element 2*l*, and the side surface of the cylinder is parallel with the line element 4*l* and includes the line element 4*l* as its own center with the radius R4.

Then, the triangle strip processing unit 122 of the surface generator 121 performs a triangle strip processing (step S27). The triangle strip processing will be explained by using FIGS. 10 to 14. When the step S27 ends, the processing returns to the calling-source processing.

Figure 10:
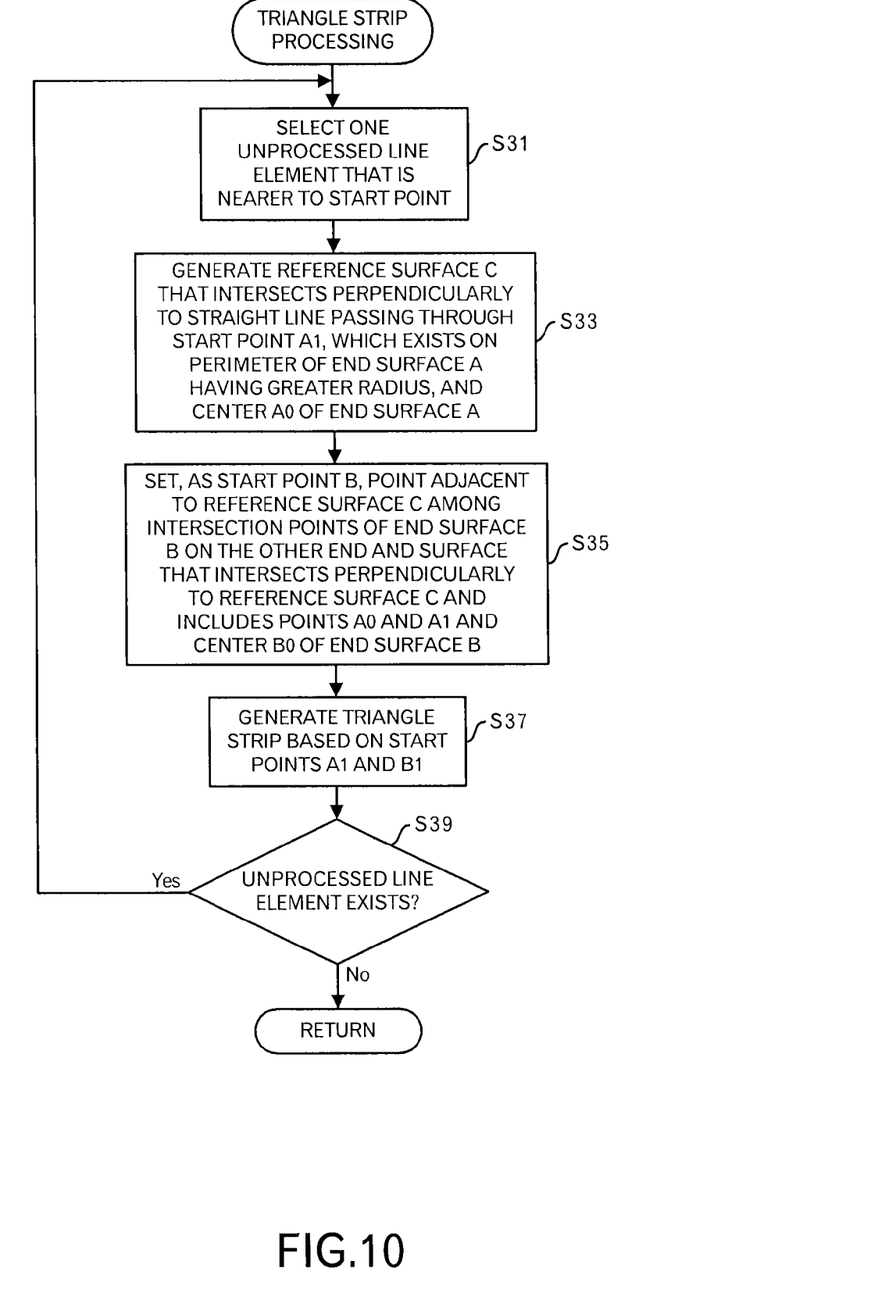
FIG. 10 is a diagram depicting a processing flow of a triangle strip processing.

Firstly, the triangle strip processing unit 122 selects one unprocessed line element that is nearer to the start point of the route with a single stroke (FIG. 10: step S31). Then, the triangle strip processing unit 122 generates a reference surface C that intersects perpendicularly to a straight line passing through a start point A1, which is an arbitrary point on the perimeter of the end surface A whose radius is greater than the other (circle or faying surface region having a radius defined for the line element relating to the processing and whose center is the end point) and the center A0 of the end surface A (step S33).

Figure 11:
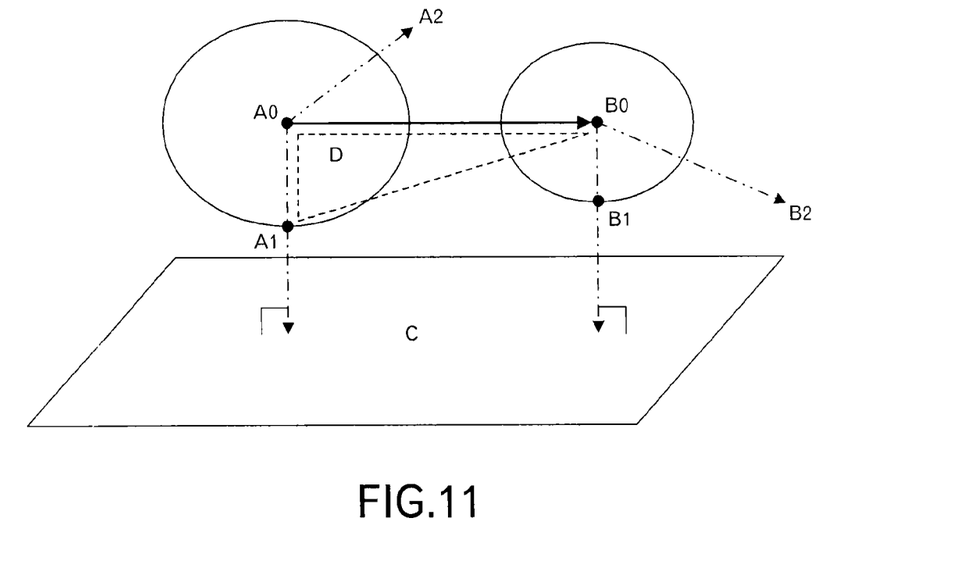
FIG. 11 is a diagram to explain the triangle strip processing.

For example, as illustrated in FIG. 11, the end surface A whose radius is greater is selected among the end surfaces A and B, and the reference surface C that intersects perpendicularly to the straight line passing through the start point A1, which is on the perimeter of the end surface A, and the center A0 of the end surface A is generated. A2 is a normal line of the end surface A.

Moreover, the triangle strip processing unit 122 sets, as a start point B1, a point that is nearer to the reference surface C among intersection points between an end surface B, which is the other end surface (circle or faying surface region having a radius defined for the line element relating to the processing and whose center is the endpoint) and a plain surface D that intersects perpendicularly to the reference surface C and includes the point A0 and A1 and a center B0 of the end surface B (step S35). A portion of the plain surface D is illustrated by a dotted line in FIG. 11. In addition, B2 is a normal line of the end surface B in FIG. 11.

Then, the triangle strip processing unit 122 generates triangle strips based on the start points A1 and B1, and stores data of the triangle strips into the second data storage unit 130 (step S37).

When there is an unprocessed line element (step S39: Yes route), the processing returns to the step S31, and when there is no unprocessed line element (step S39: No route), the processing returns to the calling-source processing.

Figure 12:
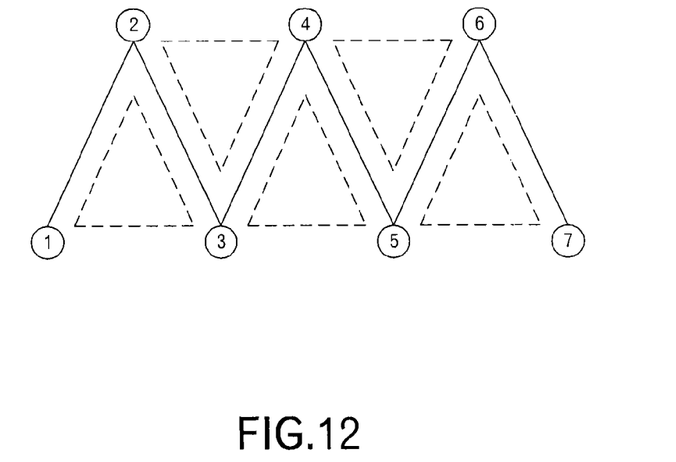
FIG. 12 is a diagram to explain triangle strip generation.

When the tubular object is displayed by using triangles, the triangle strips are often used so far. As for the triangle strips, as schematically illustrated in FIG. 12, when polygons of the triangles represented by the dotted line are defined, the vertex numbers are assigned alternately to upper vertexes and lower vertexes. Then, by defining data of vertexes in order of vertexes 1, 2 and 3, for example, edge information such as edge 1-3, edge 2-4, edge 3-5, edge 4-6 and edge 5-7 can be omitted.

For example, it is presumed that the number of tubes is m, and when the end surface is divided equally by 8, and the total number of polygons n is m*(8*2). Furthermore, when the normal vector and color information are held for each polygon, an amount of information becomes $n^3$. On the other hand, when the triangle strips are employed, it is possible to reduce an amount of information to at least order of $n^2$.

Figure 13:
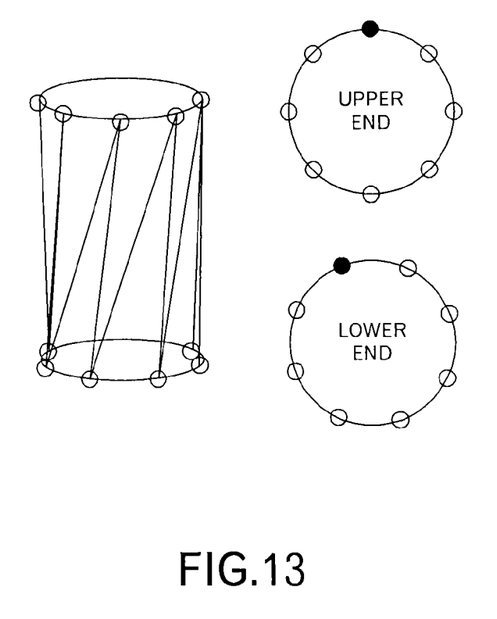
FIG. 13 is a diagram to explain an effect of the triangle strip processing.
Figure 14:
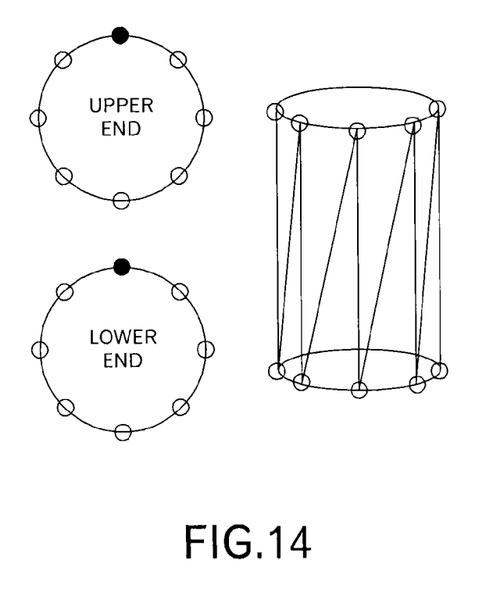
FIG. 14 is a diagram to explain the effect of the triangle strip processing.

However, as schematically illustrated in FIG. 13, in case where there is a gap between a start point (black circle) on an upper end surface and a start point (black circle) on a lower end surface, a tube having a twist may be generated as illustrated on a left side, when generating the triangle strips as the gap still exists.

As described above, when the start points can be matched by the plain surface D, there is no gap between the start point (black circle) on the upper end surface and the start point (black circle) on the lower end surface. Therefore, by carrying out the conventional triangle strip generation processing, appropriate polygons are generated as illustrated on the right side of FIG. 14, and appropriate rendering is conducted.

Returning to the explanation of the processing in FIG. 4, when the preprocessing ends, the surface generator 121 of the preprocessing unit 120 determines, based on the data stored in the first data storage unit 110, whether or not there is an unprocessed and unconnected endpoint (step S7). When there is an unprocessed and unconnected end point, the surface generator 121 selects one end point having the maximum radius or diameter among the unprocessed and unconnected end points (step S9), and sets the selected end point as the start point (step S11). Then, the processing returns to the step S5.

When there is no unprocessed and unconnected end point, the rendering processing unit 140 renders the polygons that are stored in the second data storage unit 130 and generated by the triangle strip processing to display the tubular objects onto the display device 200 (step 513). This processing is almost the same as the conventional rendering processing. Therefore, further explanation is omitted.

Figure 15:
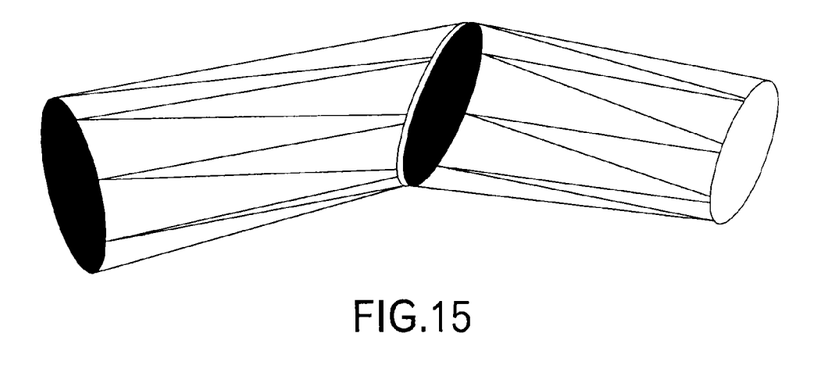
FIG. 15 is a diagram to explain an effect of the embodiment.

By performing such a processing, the gap X at the connection point as illustrated in FIG. 1 is not generated, and for example, as illustrated in FIG. 15, a state that the tubular objects are smoothly connected is displayed.

Figure 16:
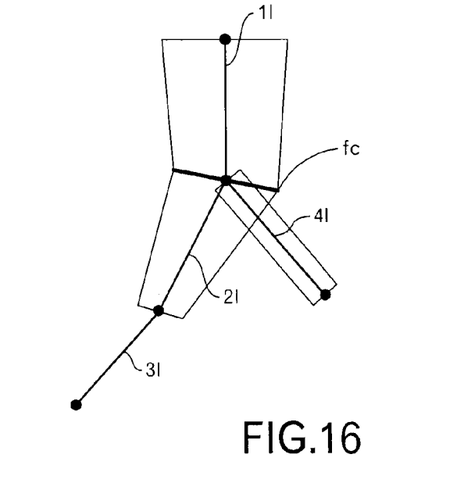
FIG. 16 is a diagram to explain the effect of the embodiment.

Moreover, when representing a state in FIG. 9 from the top, a form as illustrated in FIG. 16 is obtained. Thus, when the connection point is also the branch point, the tubular object for the line element 41, which was not selected at the branch point, is connected. However, as described above, by setting the faying surface region $f_c$, the connection portion with the tubular object of the unselected line element is hidden inside. Therefore, even when the faying surface region is not generated in relation to the unselected line element, the tubular objects can be displayed naturally.

Although the embodiment of this invention was explained, this invention is not limited to this embodiment. For example, the functional block diagram depicted in FIG. 2 is a mere example, and may not always correspond to a program module configuration. Furthermore, as for the processing flow, as long as the processing result does not change, the order of the steps may be changed, and plural steps may be executed in parallel.

Moreover, a processing for the coronary artery of the coronary circulation may be executed in parallel with a processing for a coronary vein. Furthermore, when a user instructs to display either of the coronary artery and the coronary vein, the aforementioned processing is performed by using data of either of them. Moreover, the user may set a threshold for the radius, which is set for the line element, and only the line elements whose radius is equal to or greater than the threshold may be processed. In addition, the display color of the tubular objects may be set, and the expansion ratio or reduction ratio may be designated for the radius.

An example that the average value is employed for the radius of the faying surface region was explained, however, in case of displaying the coronary circulation, the vessel gradually becomes narrow. Therefore, the radius of the faying surface region may be a radius that is equal to or greater than the average value and is less than the greater radius of the end surfaces.

Furthermore, the aforementioned information processing apparatus 100 may be implemented by one computer, or may be implemented by plural computers to execute a processing in parallel.

Figure 17:
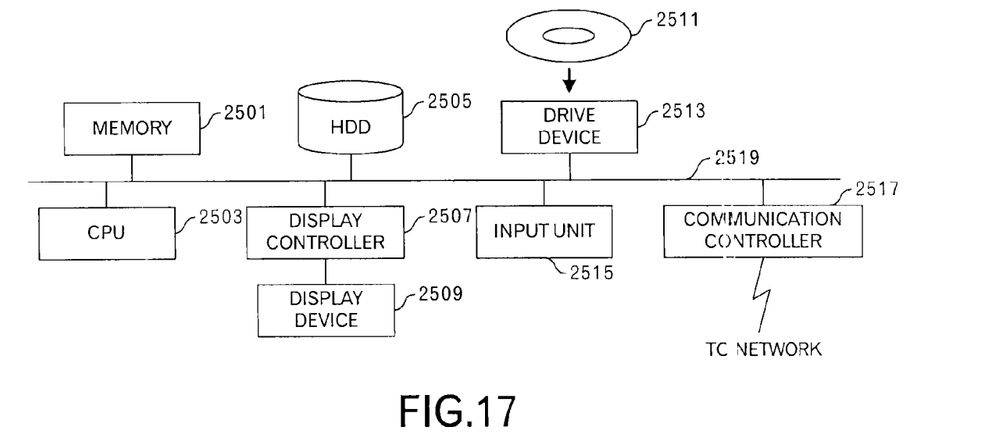
FIG. 17 is a functional block diagram of a computer.

In addition, the aforementioned information processing apparatus 100 is a computer device as illustrated in FIG. 17. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 17. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

A display processing method relating to the embodiments includes: (A) first generating data of a faying surface region between a first line element, for which the greatest radius is defined, and a second line element, for which the second greatest radius is defined (i.e. a first line element and a second line element, which are selected from a maximum or longest radius in descending order of radii), at each point where end points of plural line elements are connected, based on the first and second line elements, by using data stored in a data storage unit storing data of plural line elements for which a radius and coordinates of both end points are defined and data representing connection relationships between line elements; (B) second generating, for each line object of the plural line elements, which are stored in the data storage unit, data of a tubular object, by using a faying surface region in case where a faying surface region is generated for an end point of the line element and by using a surface region that has a radius defined for the line element and is perpendicular to the line element in case where no faying surface region is generated for an end point of the line element; and (C) displaying the data of the tubular object.

By setting such a faying surface region, no gap at the faying portion occurs, therefore, natural tubular objects can be displayed.

Moreover, the aforementioned first generating may include: generating a faying surface region having a direction of a vector obtained by adding a first unit vector having a direction of the first line element and a second unit vector having a direction of the second line element. According to this configuration, the tubular objects curve naturally. The radius of the faying surface region may be an average value of the radii of the first and second line elements.

Furthermore, the aforementioned second generating may include: for each of the plural line elements, (b1) determining a first plain surface that intersects perpendicularly to a straight line passing through a center of a first faying surface region generated for a first end point of a certain line element or a surface region used for the first end point and an arbitrary point on a perimeter of the first faying surface region or the surface region; (b2) determining a second plain surface that includes the straight line and a center of a second faying surface region generated for a second end point of the certain line element or a surface region used for the second end point and intersects perpendicularly to the first plain surface; and (b3) performing a triangle strip generation processing for the tubular object from the arbitrary point and an intersection point adjacent to the first plain surface among intersection points between the second plain surface and a perimeter of the second faying surface region or the surface region used for the second end point of the certain line element.

In order to generate the triangle strip, by carrying out such a processing, no twist occurs.

Moreover, the aforementioned first generating may include: identifying a route by tracing line elements from a line element whose radius or diameter is maximum or longest and branching off at a first point where end points of plural line elements are connected, to a line element whose radius is the greatest or longest at the first point; and identifying a route by tracing line elements from a remaining line element at a point at which the branching occurs, and branching off at a second point where end points of plural line elements are connected, to a line element whose radius is the greatest or longest at the second point.

When the vessels are displayed, it becomes possible to appropriately display the vessels by giving the priority for the thicker vessel. Thus, no gap occurs even when the branching off to two or more line elements.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process the process comprising:
    first generating, at a point where end points of plural line elements are connected, data of a faying surface region between a first line element, for which a greatest radius among radiuses of the plural line elements is defined, and a second line element, for which a second greatest radius among the radiuses is defined, by using data of a plurality of line elements for which a radius and coordinates of both end points are defined and data representing connection relationships between line elements; and
    second generating, for each line element of the plurality of line elements, data of a tubular object that is defined based on a respective faying surface region generated for each of the line elements; and
    rendering the data of the tubular object to display the tubular object on a display apparatus.

2. The computer-readable, non-transitory storage medium as set forth in claim 1, wherein the faying surface region between the first line element and the second line element has a direction of a vector obtained by adding a first unit vector having a direction of the first line element and a second unit vector having a direction of the second line element.

3. The computer-readable, non-transitory storage medium as set forth in claim 1, wherein the second generating comprises:
    determining a first plain surface that intersects perpendicularly to a straight line passing through a center of a first faying surface region generated for a first end point of a certain line element and an arbitrary point on a perimeter of the first faying surface region;
    determining a second plain surface that includes the straight line and a center of a second faying surface region generated for a second end point of the certain line element and intersects perpendicularly to the first plain surface; and
    generating triangular surfaces for the tubular object from the arbitrary point and an intersection point adjacent to the first plain surface among intersection points between the second plain surface and a perimeter of the second faying surface region.

4. The computer-readable, non-transitory storage medium as set forth in claim 1, wherein the first generating comprises:
    tracing line elements from the first line element; and
    branching off to a line element having a greatest radius at each point where end points of plural line elements are connected.

5. A display processing method comprising:
  first generating, by using an information processing apparatus, at a point where end points of plural line elements are connected, data of a faying surface region between a first line element, for which a greatest radius among radiuses of the plural line elements is defined, and a second line element, for which a second greatest radius among the radiuses is defined, by using data of a plurality of line elements for which a radius and coordinates of both end points are defined and data representing connection relationships between line elements;
  second generating, by using the information processing apparatus, for each line element of the plurality of line elements, data of a tubular object that is defined based on a respective faying surface region generated for each of the line elements;
  and
  rendering, by using the information processing apparatus, the data of the tubular object to display the tubular object on a display apparatus.

6. A display processing apparatus comprising:
  a memory; and
  a processor configured to:
  first generate, at a point where end points of plural line elements are connected, data of a faying surface region between a first line element, for which a greatest radius among radiuses of the plural line element is defined, and a second line element, for which a second greatest radius among the radiuses is defined, by using data of a plurality of line elements for which a radius and coordinates of both end points are defined and data representing connection relationships between line elements;
  second generate, for each line element of the plurality of line elements, data of a tubular object that is defined based on a respective faying surface region generated for each of the line elements; and
  render the data of the tubular object to display the tubular object on a display apparatus.

* * * * *